UNITED STATES PATENT OFFICE.

MESROB VARJEBEDIAN, OF FRESNO, CALIFORNIA.

PROCESS FOR CURING FIGS FOR USE IN MAKING A BEVERAGE.

1,218,914.     Specification of Letters Patent.     Patented Mar. 13, 1917.

No Drawing.     Application filed December 4, 1916. Serial No. 134,893.

*To all whom it may concern:*

Be it known that I, MESROB VARJEBEDIAN, a citizen of the Empire of Turkey, and a resident of the city of Fresno, county of Fresno, and State of California, have invented a new and useful Process for Curing Figs for Use in Making a Beverage, of which the following is a specification.

My invention relates to the curing of figs for use in making a beverage which is pleasant to the taste and healthful. In the process hereinafter described any edible figs may be used, but for the best results I prefer to use ripe Calimyrna figs which have been picked from the trees, and which have been dried and cured in the shade. Some figs are richer in sugar than other varieties, and I prefer to use those which have the most sugar in them which is indicated when the small hole at the lower end of the fig is covered with a coating of sugar. While the less developed figs can be used for this purpose, the grade of tea procured is inferior to the tea made from the better quality of figs.

In the process invented by me I first prepare a solution of approximately 5 gallons of water, 2 pounds of common salt, and 1 pound of lime which is dissolved in a quart of water. These ingredients are put together and agitated until the water has absorbed the salt and lime. Five gallons of this solution is necessary for the treatment of about ten pounds of dried figs. The figs are soaked in this solution for about fifteen minutes, after which they are taken out, drained, and then dried in the shade. The figs are then sliced in pieces about one-eighth to one-quarter of an inch thick, and they are then dried in a kiln or oven to harden the cut surfaces, after which they are roasted in an oven until they are browned. When cooled the pieces of figs should be packed in air tight packages until desired for use. Before roasting the odor of the figs can be changed by sprinkling essence of roses or violets over them. This change of odor is not necessary in the process.

I claim as new and ask for Letters Patent upon:

1. A process for curing figs consisting of drying them, subjecting them to a bath consisting of a mixture of approximately 5 gallons of water, 2 pounds of salt, and 1 pound of lime, again drying them, cutting them into pieces, and roasting them until browned, substantially as described and for the purposes set forth.

2. A process for curing dried figs for use in making a beverage therefrom, consisting of subjecting the dried figs to a bath containing water, salt and lime, then drying them, and roasting them until browned, substantially as described.

3. A process for curing figs consisting of soaking them in a solution of water, salt and lime, for about fifteen minutes, then drying them, cutting them into pieces, and then browning them by heat, substantially as described.

4. A process for treating figs preparatory to making a tea therefrom consisting of drying the figs, subjecting them to a bath of about fifteen minutes duration in a solution of water, salt and lime, then again drying them, cutting them into pieces, and roasting them, substantially as described.

5. A process for treating figs prior to making tea therefrom, consisting of impregnating the figs with salt and lime, and then roasting them until they assume a brown color.

6. A confection consisting of figs which have been dried, then subjected to a bath of a solution of water, salt and lime, then cut into pieces, and roasted by heat until they are of a brown color.

7. A confection for use in making a tea consisting of dried figs which have been soaked for about fifteen minutes in a bath consisting approximately of five gallons of water, two pounds of salt and one pound of lime, then dried, cut into pieces, and roasted until they are browned, substantially as described.

MESROB VARJEBEDIAN.

Witnesses:
JULIUS HANSEN,
C. P. HUNKSMAN.